United States Patent [19]

Tanaka et al.

[11] Patent Number: 5,115,969
[45] Date of Patent: May 26, 1992

[54] FLOOR STRUCTURE AND CONSTRUCTION METHOD

[75] Inventors: Yoshimasa Tanaka, Chiba; Tomotsu Kondow, Tokyo, both of Japan

[73] Assignee: Tanaka Homes Co., Ltd., Chiba, Japan

[21] Appl. No.: 416,454

[22] Filed: Oct. 3, 1989

[30] Foreign Application Priority Data

Oct. 3, 1988 [JP] Japan .................. 63-250525

[51] Int. Cl.⁵ ............................................. F24D 5/10
[52] U.S. Cl. ............................................. 237/69; 165/47
[58] Field of Search .................. 237/69, 1 R; 165/45, 165/49, 47, 53, 46; 126/263

[56] References Cited

U.S. PATENT DOCUMENTS

| | | | |
|---|---|---|---|
| 4,459,973 | 7/1984 | Royer | 237/69 X |
| 4,588,125 | 5/1986 | Lutz | 237/69 |
| 4,817,707 | 4/1989 | Aoyama et al. | 165/46 |

FOREIGN PATENT DOCUMENTS

| | | | |
|---|---|---|---|
| 801355 | 5/1936 | France | 237/69 |
| 278195 | 10/1927 | United Kingdom | 237/69 |

Primary Examiner—Henry Bennett
Attorney, Agent, or Firm—Oblon, Spivak, McClelland, Maier & Neustadt

[57] ABSTRACT

A flooring structure comprising an exothermic body for heating purposes laid in a space provided under a floor, and a heat accumulating material having viscoelastic and/or elastic properties and capable of retaining water therein, which is filled into the space, and a method of constructing the floor structure are disclosed.

9 Claims, 1 Drawing Sheet

FLOOR STRUCTURE AND CONSTRUCTION METHOD

BACKGROUND OF THE INVENTION

The present invention relates to a flooring structure with a superior heating effect and excellent cushioning capabilities, and a method of constructing this floor.

Conventionally, in a floor heating system an exothermic body, such as a pipe or the like for circulating hot water, is laid under the floor surface. In this type of floor heater, it is necessary to place a heat accumulating material underneath the flooring and in the vicinity of the exothermic body to quickly and effectively perform the heating. To store the heat it is necessary to have a storage material with high heat accumulating capabilities and a suitable degree of heat conductance, reasonable cost, and which also maintains a comfortable floor surface.

Conventionally, concrete has been proposed as this type of heat accumulating material. However, concrete has no elasticity, so when a flooring material, tatami mat (straw matting), or the like is laid on top to form the floor surface, a sensation of hardness is imparted when such a floor is walked upon and the lack of comfort is undesirable from the aspect of the health of the users. In addition, if an abnormality is produced in the exothermic body, maintenance and repairs cannot be easily performed.

SUMMARY OF THE INVENTION

An object of the present invention is to provide, with due consideration to the drawbacks of such conventional processes and methods, a flooring structure with a superior heating effect and excellent cushioning capabilities.

A second object of the present invention is to provide a method whereby such a floor structure can be conveniently constructed at the site, and a construction method whereby the heating efficiency can be improved.

These objects are achieved in the present invention by the provision of a flooring structure wherein an exothermic body for heating purposes is laid in a space provided under the floor and a heat accumulating material which has both viscoelastic or elastic properties and retains water is filled into the space.

In the method of constructing the flooring structure of the present invention, a closed space is provided under the flooring surface with one part remaining open, and an exothermic body for heating purposes is laid in this closed space. Then water and a shaping agent, maintained in a flowable state, are poured into the closed space to form the heat accumulating material in the closed space. This heat accumulating material has viscoelastic or elastic properties and retains water.

Water retained in the heat accumulating material has a large heat capacity and a suitable degree of heat conductance. The heat from the exothermic body is stored in the heat accumulating material under the floor and is transmitted to the floor surface. Water is retained in the heat accumulating material and essentially no water is washed out, so no complicated waterproofing structure is required for the floor. In addition, the heat accumulating material can also be used as a cushioning material to provide good walking comfort.

The heat accumulating material is formed at the construction site so supplies are easily handled. The heat accumulating material can also be formed and shaped over existing hot water pipes being used as an exothermic body, therefore the contact of the heat accumulating material with hot water pipes and the undersurface of the flooring is very satisfactory.

DESCRIPTION OF THE DRAWINGS

These and other objects, features, and advantages of the present invention will become more apparent from the following description of a preferred embodiment taken in conjunction with the accompanying drawing, in which.

DETAILED DESCRIPTION OF THE INVENTION

Figure 1:
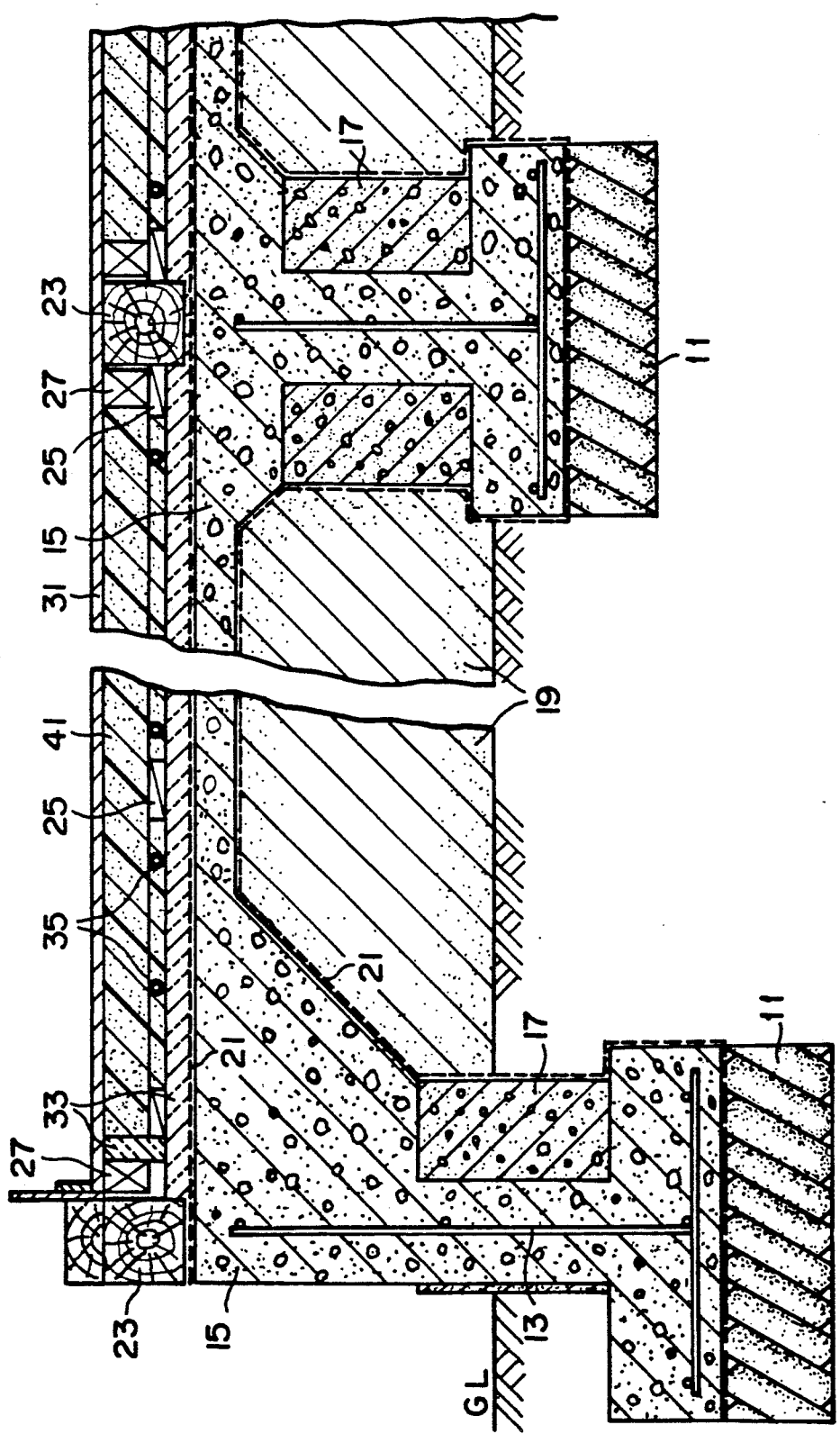
FIG. 1 is a partial sectional view of an example of a floor structure according to the present invention.

Now referring to FIG. 1, an example of a floor structure of the present invention will now be explained, which shows the case where the flooring structure of the present invention is the first floor of a wooden dwelling. In FIG. 1, a concrete foundation floor 15 is formed on footings 11. In the figure, reference numeral 13 indicates a reinforcing bar; reference numeral 17, concrete blocks; reference numeral 19, a fill-up; and reference numeral 21, a sheet of polyethylene film for waterproofing, used in the flooring structure of the present invention.

A joist 27 is mounted on a sill 23, and a floor surface 31 of a flooring material such as planking, tatami mat or the like is formed on the joist 27. In the closed space under the floor surface 31, an insulating material 33 such as foamed styrene or the like is provided on the upper part and outside of the foundation plate 15 (the inside of the outer periphery of the joist 27) so that only the floor surface 31 remains. In addition, a plurality of hot water pipes 35 (exothermic body) are laid in the closed space under the floor surface 31, and this closed space is completely filled with a heat accumulating material 41. It is desirable to provide a waterproofing treatment by painting or spraying a waterproofing agent on the surface of the flooring material or the like which is in contact with the heat accumulating material 41.

The heat accumulating material 41 used in the present invention is a material with viscoelastic and/or elastic properties which retains water and is, for example, in the form of a gel or the like.

When hot water is passed through the hot water pipes 35 to heat the floor, the heat accumulating material 41 is warmed by this heat which is then transmitted to the entire floor surface 31. In the present invention, the entire flooring structure with the exception of the floor surface 31, is continuously enclosed by the insulating material 33, and the heat accumulating material containing water has a large heat capacity and exhibits a suitable degree of heat conductance. Therefore, it is possible to effectuate floor heating with a high thermal efficiency. Furthermore, it is possible to quickly exhibit a heating effect. In addition, the heat accumulating material 41 provides viscoelastic and/or elastic properties so that it has superior cushioning capabilities and is comfortable to walk upon.

Examples which can be given of the heat accumulating material 41 which has both viscoelastic and elastic properties and retains water are: materials such as a cross-linked high molecular hydrophilic polyvinyl alcohol (PVA) which retains water, or the like; a mixture containing water and sodium silicate; gelled materials such as jelly-like materials; highly water absorptive, high molecular materials such as starches, cellulose-based polyacrylic materials, PVA/polyacrylic materials which absorb and retain water. These materials absorb or take in and strongly retain water, and the water-retaining body exhibits viscoelastic (a material which is viscous but also exhibits certain elastic properties) and/or elastic properties.

In addition, by dispersing a finely-divided inorganic material throughout the water-containing heat accumulating material it is possible to appropriately enhance the degree of heat transmission.

Among industrial waste materials there are many which incur a wide variety of disposal costs. For example, there are slurries and aqueous suspensions of finely-divided inorganic materials in colloid form. There is no simple solid-liquid separation method for this type of slurry or aqueous suspension. It is generally filtered, slurred, dried, and incinerated. For example, in an aluminum surface treatment (washing) factory the surface of the aluminum is washed with sulfuric or nitric acid or the like, but because this wash water cannot be discarded in the untreated form, it is neutralized with sodium hydroxide or the like. However, after neutralization, the materials which are insoluble in water are formed. The main components of the materials are aluminum hydroxide and aluminum sulfate, which are suspended as colloids and cannot be easily separated out, even with the use of a coagulating agent. Accordingly, after discarding the supernatant liquid as waste water it becomes necessary to treat the remaining suspension or slurry, and a treatment must be carried out, incurring treatment costs as previously mentioned.

By converting this type of suspension or slurry to a gel and shaping it, a material which has viscoelastic and/or elastic properties and retains water can be obtained. This material can be effectively used as the heat accumulating material in the present invention. Treatment of the suspension-containing waste water is therefore unnecessary so that it is possible not only to effectively utilize an industrial waste material, but also to reduce the cost of the heat accumulating material and therefore the construction costs.

Specifically, if, for example, the above-mentioned suspension or slurry is mixed with water glass, or mixed with powdered sodium silicate and heated, or if a cross-linking agent is added to a hydrophilic polymer of a polyvinyl alcohol and cross-linked with the suspension or slurry, it is possible to obtain a heat accumulating material with viscoelastic and elastic properties, shaped in a water-retaining state. The amount of the shaping agent such as water glass which is used may be suitably determined from the amount of water contained in the suspension or slurry.

The heat accumulating material 41 can also be prepared in advance and filled at the building site. Water or a suspension or slurry is mixed with a shaping agent (gelling agent, high molecular cross-linking agent, or the like) such as water glass, and this mixture is poured into the closed space under the floor surface 31 in a state which maintains the flowability, then it is hardened and shaped in this space. By this means, the heat accumulating material 41 is brought into close contact with the hot water piping 35 or the underpart of the floor surface, and the heat from the hot water piping 35 is transmitted very quickly and effectively to the floor surface 31. When the floor is constructed, one part of the floor surface 31 is left open and the materials for the heat accumulating material 41 are poured into the closed space through this opening. Because the material is highly mobile it can easily be handled through a small pump. Also, because the material is usually in the form of a liquid or a powder before filling into the closed space, it can easily be handled.

The flooring structure of the present invention can also be utilized for flooring on the second or higher floors. In this case, in addition to the effects outlined above, if a fire were to occur, this structure can also demonstrate an effect which prevents the spread of the fire because of the water retained in the heat accumulating material.

With the flooring structure of the present invention, by pouring a heat accumulating material which has viscoelastic and/or elastic properties and retains water into the space under the flooring, a high floor heating effect and good cushioning is obtained.

In addition, if the heat accumulating material is used in gel form, an even greater superiority in the cushioning effect is obtained because of the high (visco) elasticity of the material.

If the industrial wastes from an aluminum surface washing factory in suspension or slurry form are shaped and used as the heat accumulating material, in addition to providing effective utilization of resources, construction costs can also be lowered.

If the method of the present invention is implemented at the construction site, the operation is easily performed and excellent contact of the various members can be provided so that the heat transmission is improved and effective heating is possible.

EXAMPLE

A flooring structure was formed in the same way as indicated in FIG. 1. One part of a floor surface 31 was left open and a heat accumulating material 41 was filled into the space under the floor surface 31 as outlined below.

One part by weight of sodium silicate powder was added to three parts by weight of a waste liquid slurry from an aluminum surface treatment plant for which the main slurry component was aluminum hydroxide, and the mixture was heated with agitation. As soon as the heating commenced the material slowly began to gel so a pump was used to pour the material into the space under the floor surface 31 while it was still in a flowable condition, and the material was allowed to harden. The opening was blocked up, to provide the floor structure of the present invention.

When hot water was circulated through the hot water pipes the floor was quickly warmed. In addition, after the hot water had circulated for a uniform time, the heating effect was maintained over a long period, even when the flow of hot water was stopped.

What is claimed is:
1. A flooring structure comprising:
an exothermic body for heating purposes laid in a space provided under a floor surface; and
a heat accumulating material completely filling said space under said floor surface so as to completely surround said exothermic body, said heat accumulating material having viscoelastic properties and being capable of absorbing and retaining water therein, said heat accumulating material also having a large heat capacity for providing heat to said floor surface and acting as a cushioning material for providing walking comfort on said floor surface, wherein said heat accumulating material is in a gel form.

2. A flooring structure comprising:
an exothermic body for heating purposes laid in a space provided under a floor; and
a heat accumulating material having viscoelastic properties and capable of retaining water therein, which is filled into said space so as to completely surround said exothermic body, wherein said heat accumulating material is in a gel form.

3. The flooring structure as claimed in claim 1, wherein said heat accumulating material is a substance which retains waste water containing finely-divided suspended particles from an aluminum surface treating process.

4. A method of constructing a flooring structure comprising an exothermic body for heating purposes laid in a space provided under a floor, and a heat accumulating material having viscoelastic properties and capable of retaining water therein, which is filled into said space, comprising the steps of:
providing said closed space under the flooring surface of which part remains open;
laying said exothermic body for heating purposes in said closed space; and
pouring water and a shaping agent, maintained in a flowable state, into said closed space to form said heat accumulating material in said closed space.

5. The flooring structure as claimed in claim 2, wherein said heat accumulating material is a substance which retains waste water containing finely-divided suspended particles from an aluminum surface treating process.

6. The flooring structure as claimed in claim 1, wherein said exothermic body comprises a plurality of hot water pipes.

7. The flooring structure as claimed in claim 2, wherein said exothermic body comprises a plurality of hot water pipes.

8. A flooring structure comprising:
an exothermic body for heating purposes laid in a space provided under a floor surface; and
a heat accumulating material completely filling said space under said floor surface, said heat accumulating material having viscoelastic properties and being capable of absorbing and retaining water therein, said heat accumulating material also having a large heat capacity for providing heat to said floor surface and acting as a cushioning material for providing walking comfort on said floor surface, wherein said heat accumulating material is in a gel form and said heat accumulating material is a substance which retains waste water containing finely-divided suspended particles from an aluminum surface treating process.

9. A flooring structure comprising:
an exothermic body for heating purposes laid in a space provided under a floor; and
a heat accumulating material having viscoelastic properties and capable of retaining water therein, which is filled into said space, wherein said heat accumulating material is in a gel form and said heat accumulating material is a substance which retains waste water containing finely-divided suspended particles from an aluminum surface treating process.

* * * * *